US012572018B1

(12) United States Patent
Zhang

(10) Patent No.: US 12,572,018 B1
(45) Date of Patent: Mar. 10, 2026

(54) RECORDING INDICATOR

(71) Applicant: Apple Inc., Cupertino, CA (US)

(72) Inventor: Arthur Y Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/192,579

(22) Filed: Mar. 29, 2023

Related U.S. Application Data

(60) Provisional application No. 63/325,109, filed on Mar. 29, 2022.

(51) Int. Cl.
| | |
|---|---|
| *G02B 27/01* | (2006.01) |
| *G06V 10/141* | (2022.01) |
| *G06T 19/00* | (2011.01) |

(52) U.S. Cl.
CPC ....... G02B 27/0172 (2013.01); G06V 10/141 (2022.01); *G02B 2027/0138* (2013.01); *G06T 19/006* (2013.01)

(58) Field of Classification Search
CPC .............. G02B 27/0172; G02B 27/017; G02B 2027/0178; G06V 20/20; G06V 20/52; G06V 10/141; G06T 19/006; G03B 17/561; G03B 21/2033; G03B 15/03
See application file for complete search history.

(56) References Cited

U.S. PATENT DOCUMENTS

| | | | |
|---|---|---|---|
| 4,411,528 | A | 10/1983 | Newcomb |
| 6,400,903 | B1 | 6/2002 | Conoval |
| 7,433,587 | B2 | 10/2008 | Kosaka |
| 7,922,329 | B1 | 4/2011 | Graether |
| 9,955,286 | B2 | 4/2018 | Segal |
| 10,168,778 | B2 | 1/2019 | Kazansky et al. |
| 10,354,146 | B1 * | 7/2019 | Vaziri ..................... G06F 3/012 |
| 11,391,967 | B1 * | 7/2022 | Hatzilias .............. H05K 1/0274 |
| 11,442,342 | B2 | 9/2022 | Schwab et al. |
| 11,775,049 | B2 | 10/2023 | Hoffman |

(Continued)

FOREIGN PATENT DOCUMENTS

| | | |
|---|---|---|
| CN | 207080944 U | 3/2018 |
| EP | 2362637 | 8/2011 |
| JP | 2007295152 | 11/2007 |

OTHER PUBLICATIONS

International Search report and written opinion from PCT/US2020/066552, dated Apr. 12, 2021, pp. 1-12.

(Continued)

*Primary Examiner* — Xuemei Zheng
(74) *Attorney, Agent, or Firm* — Robert C. Kowert; Kowert, Hood, Munyon, Rankin & Goetzel, P.C.

(57) ABSTRACT

Recording indicators for head-mounted devices (HMDs) that provide protection from tampering so that the recording indicators cannot be easily disabled or masked. A recording indicator may be integrated in a lens of an HMD and may emit visible light from the lens into the environment when the camera is in record mode. The light is visible to persons within the field of view of the camera when in record mode. The recording indicator may emit a portion of the light towards the wearer's eye. Alternatively, instead of emitting light, a recording indicator may generate a mirrored or tinted region in the HMD lens that is visible to persons within the field of view of the camera when the camera is in record mode.

19 Claims, 10 Drawing Sheets

(56) References Cited

U.S. PATENT DOCUMENTS

| | | |
|---|---|---|
| 2001/0010760 A1 | 8/2001 | Saito |
| 2003/0043287 A1 | 3/2003 | Kakiuchi et al. |
| 2006/0104621 A1 | 5/2006 | Nakata |
| 2007/0103552 A1 | 5/2007 | Patel et al. |
| 2008/0190255 A1 | 8/2008 | McCracken et al. |
| 2008/0198255 A1 | 8/2008 | Kirihara et al. |
| 2010/0008501 A1 | 1/2010 | Iwasaki |
| 2011/0170849 A1 | 7/2011 | Chang |
| 2011/0199533 A1 | 8/2011 | Drader |
| 2011/0211807 A1 | 9/2011 | Drader |
| 2011/0292251 A1 | 12/2011 | Takayanagi et al. |
| 2014/0334676 A1 | 11/2014 | Skans et al. |
| 2015/0157194 A1 | 6/2015 | Okuda et al. |
| 2016/0305871 A1 | 10/2016 | Gerst, III |
| 2018/0088687 A1 | 3/2018 | Hanover |
| 2018/0091729 A1* | 3/2018 | Hanover .............. G06F 3/0346 |
| 2018/0160020 A1 | 6/2018 | Djakovic |
| 2018/0232899 A1 | 8/2018 | Lansel |
| 2018/0274997 A1 | 9/2018 | Shang |
| 2019/0068768 A1 | 2/2019 | Garg et al. |
| 2019/0171023 A1 | 6/2019 | Carlvik |
| 2019/0199907 A1 | 6/2019 | Daulton |
| 2019/0206917 A1 | 7/2019 | Nakajiki |
| 2019/0268518 A1 | 8/2019 | Howard |
| 2019/0306391 A1 | 10/2019 | von Cramon |
| 2020/0012095 A1* | 1/2020 | Edwin ..................... G06F 3/011 |
| 2020/0018964 A1* | 1/2020 | Hillenbrand ............. G03H 1/22 |
| 2020/0143534 A1 | 5/2020 | Wright |
| 2021/0181597 A1 | 6/2021 | Moon et al. |
| 2021/0191133 A1 | 6/2021 | Schwab et al. |
| 2021/0203827 A1 | 7/2021 | Frevert |
| 2021/0349366 A1 | 11/2021 | Chen et al. |
| 2021/0357626 A1 | 11/2021 | Floerkemeier et al. |
| 2022/0254271 A1* | 8/2022 | Clark ..................... G09B 17/02 |
| 2023/0057283 A1* | 2/2023 | Gupta ............... G02B 27/0172 |
| 2023/0156314 A1* | 5/2023 | Sztuk ..................... G06F 3/011 |
| | | 348/222.1 |
| 2023/0341752 A1 | 10/2023 | Schwab et al. |

OTHER PUBLICATIONS

International Search report and Written Opinion from PCT/US2020-066552, dated Jun. 11, 2021, pp. 1-21.

U.S. Appl. No. 19/002,384, filed Dec. 26, 2024, Schwab, et al.

* cited by examiner

*600*

*start*

A light source emits light.
1100

An optics component directs the light to an input coupler for a waveguide integrated in the HMD lens.
1110

The waveguide directs the light to an output coupler in the HMD lens.
1120

The light is emitted from the output coupler through the lens and into the environment.
1130

*end* start

Recording mode for the camera is activated.
*1300*

Power is turned on to a light source embedded in the HMD lens.
*1310*

Light is emitted from the light source through the lens and into the environment.
*1320* end

RECORDING INDICATOR

This application claims benefit of priority to U.S. Provisional Application Ser. No. 63/325,109, entitled "Recording Indicator," filed Mar. 29, 2022, and which is hereby incorporated herein by reference in its entirety.

BACKGROUND

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for providing recording indicators in head-mounted devices (HMDs) including but not limited to HMDs used in extended reality (XR) applications are described. HMDs may include wearable devices such as headsets, helmets, goggles, or glasses. An XR system may include an HMD which may include one or more cameras that may be used to capture still images or video frames of the user's environment. In addition, an HMD may be implemented that does not necessarily provide XR capabilities but that does include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses.

In at least some systems, the HMD may include recording functionality that allows the user to record images or video of the real environment captured by the HMD camera(s). However, for privacy or other reasons, persons in an environment may want to know if and when they are being recorded by a user's HMD.

Various embodiments of recording indicators for HMDs that provide protection from tampering so that the recording indicators cannot be easily disabled or masked are described. Embodiments of recording indicators that include a light embedded in a lens of an HMD (e.g., in a lens of a pair of glasses that are a component of an XR system) are described. When the HMD's camera(s) are recording, the light is on. When the HMD's camera(s) are not recording, the light goes off. The embedded light may not interfere with the view of the wearer through the HMD's lens. By embedding the recording indicator light in the lens, blocking the light by taping or painting over the light, or by removing the light, is much less feasible, as such a modification would be more detectable to persons in the environment being recorded and would interfere with the view of the environment by the wearer. Alternatively, recording indicators are described that include active components that may generate a mirrored or tinted region of the HMD lens that is visible to persons within the field of view of the camera when in record mode.

Figure 1A:
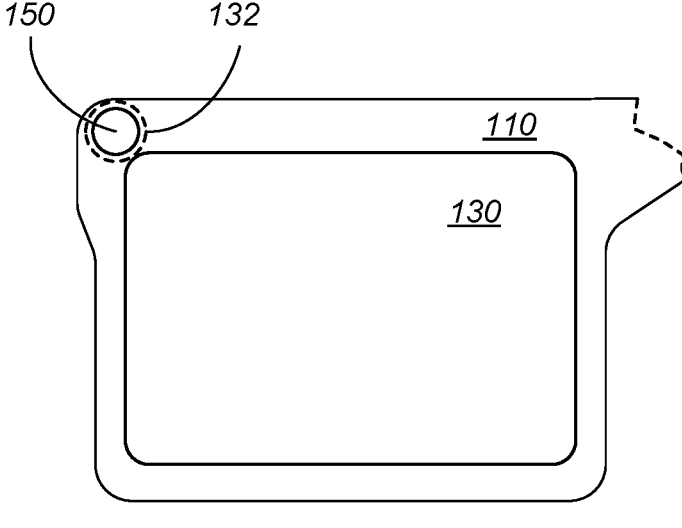
FIG. 1A illustrates a conventional location of a recording indicator light in a head-mounted device (HMD) such as a pair of glasses.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing recording indicators in head-mounted devices (HMDs) including but not limited to HMDs used in extended reality (XR) applications are described. HMDs may include wearable devices such as headsets, helmets, goggles, or glasses. An XR system may include an HMD which may include one or more cameras that may be used to capture still images or video frames of the user's environment. In addition, an HMD may be implemented that does not necessarily provide XR capabilities but that does include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses. In at least some systems, the HMD may include recording functionality that allows the user to record images or video of the real environment captured by the HMD camera(s). However, for privacy or other reasons, persons in an environment may want to know if and when they are being recorded by the camera(s) of a user's HMD.

Conventional video recording systems (e.g., conventional handheld video cameras) may include indicators (e.g., red or green LED lights) that are turned on when the cameras are recording video, and turned off when the cameras are not recording video. These recording indicators signal to persons in the environment that the video recording system is (or is not) recording video of the environment in front of the camera. However, these conventional recording indicators may be easily defeated, for example by mechanically disabling the light or by simply placing a piece of opaque tape over the light. For hand-held devices like conventional handheld video cameras, smartphones, and tablet or pad devices, the lack of a visible recording indicator may not be a major issue, as the physical act of recording with these devices in itself may indicate to persons that they are (or may be) being recorded.

However, HMDs are worn on a user's head, and thus there is no clear physical motion that would indicate whether or not the wearer may be currently recording video. Thus, there is a need for recording indicators for HMDs that cannot be easily defeated so that persons in an environment can be aware that they are being recorded by a HMD's camera.

An example HMD may be referred to as "smart glasses". These devices enable wearers to capture photos and videos of their environment. However, such devices have a social acceptance, and privacy, problem. A recording indicator light, if present on such devices, is typically located on the frame near the camera to let others know when they are being recorded, but the indicator is typically small, not bright, and not very visible, or is easily obfuscated by covering it with paint or tape. A more obvious and less easily obfuscated recording indicator is thus needed that shows others around the wearer when they are being recorded, and that may also signal to the wearer when the camera is on.

Embodiments may provide an HMD such as a pair of smart glasses that includes an optical stack that enables light to be emitted from a portion of the clear lens when a camera of the HMD is recording to thus act as a recording indicator. In some embodiments, the optical stack includes passive components including an input coupler, a clear transmissive optical element such as a waveguide, and an output coupler. The input and output couplers may, for example, be implemented using relief gratings or volume holography. In some embodiments, the HMD may also include a light source and optics, either dedicated to the recording indicator functionality or part of the XR display system that directs light into the input coupler. The light source may be an LED (light-emitting diode), Laser, or other suitable light source. The optics may include one or more optical lenses that act as collection optics to focus and collimate light emitted by the light source. The light source and optics may, for example, be located within a frame of the HMD. The light from the light source and optics is directed through the waveguide to the output coupler. The output coupler directs the light away from the wearer into the environment. In some embodiments, the light directed away from the wearer may have an emission cone that is equal to or greater than the field of view of the camera. This enables others to know they are being recorded when they can see the recording indicator light, and know they are not being recorded when they do not see the recording indicator light, even if the camera is on and recording. In some embodiments, the output coupler may also direct a portion of the light towards the wearer's eye. Alternatively, a separate output coupler could be used to direct a portion of the light towards the wearer's eye. In some embodiments, the portion of the light that is directed to the wearer's eye may be configured to cover the eye box of the wearer so the wearer can know when the camera is on.

In some embodiments, the light source may be hardware-coupled to the camera so that the light source cannot be easily disabled.

In some embodiments, a recording indicator system may include a light source and optical stack similar to that described above, but with an active input coupler and/or active output coupler that can direct the light away from the wearer, to the wearer's eye, or to stay within the lens. An active coupler may, for example, be a switchable type of polarizer that can be turned on and off. In some embodiments, there could be a physical aperture stop that can be opened or closed. In some embodiments, the output coupler could be a switchable grating that can be switched to direct light in different directions, for example into the environment or towards the wearer's eye.

In some embodiments, rather than emitting light into the environment, the recording indicator system may include active components that tint at least a portion of the clear lens when the camera is enabled and in record mode. The visibility of the tint may be only noticeable in the field of view (FOV) coverage of the camera; the active components do not significantly impact the clarity of the clear lens for the wearer. Similarly, in some embodiments, the recording indicator system may include active components that create a mirror effect in at least a portion of the lens while not significantly impacting the clarity of the clear lens for the wearer. "Clarity" here means that the tint or mirror effect does not impact the wearer's visual acuity. However, the tinted or mirrored portion of the lens may change the colors or amount of light the wearer sees through that portion. In some embodiments, the active components may rely on ambient light from the environment to generate the tint or mirror effect. However, in some embodiments, a light source and waveguide with input and output couplers may be used with the active components to generate or enhance the tint or mirror effect, especially in low-light conditions which may, for example, be detected by an ambient light sensor of the HMD.

In some embodiments, the recording indicator light generated by the system within the lens may be spatially moved around the clear lens and/or may be modulated in time/frequency to make the recording indicator more noticeable. The recording indicator light can be different colors, and/or could have certain frequency patterns, to make it more noticeable. In some embodiments, the recording indicator may be pulsed, or changed spatially, or output in different shapes or colors, to make the emission-based, tint-based, or mirrored-based output more noticeable. In some embodiments, a spatialized LED light source may be used; depending on which LED is on, the light could be coupled to a different output coupler. Alternatively, there could be an active component in the optical stack that redirects the light angle so that the hits a different output coupler. If active couplers are used, different ones of an array of couplers could be switched off or on at different times.

In some embodiments, instead of having a light source and optical stack in the frame and, an input coupler, a waveguide, and an output coupler configured to emit light from within the lens, a recording indicator system may instead include an embedded light source or sources inside the clear lens of the HMD. The light source may include very thin, or transparent, electrical leads and contacts from a power source to a light emitting source such as a small LED, or to a transparent light emitting source such as a transparent OLED, embedded in the lens. In some embodiments that include a transparent OLED, a light stop may be used to block the light from being visible to the wearer, and/or to control the frequency or intensity of the light, and may be an absorptive, reflective, passive or switchable light stop.

FIG. 1A illustrates a conventional location 132 of a recording indicator light in an HMD such as a pair of smart glasses. Conventionally, recording indicators have been implemented that are integrated in a frame 110 of the HMD, or embedded in the camera 150. A problem with integrating a recording indicator light in the frame 110 of an HMD is that the recording indicator can fairly easily be obfuscated by painting or taping over the light, or can be disabled or removed from the frame 110. Embedding a recording indicator light in a camera 150, makes the recording indicator light more difficult to obfuscate, but complicates the manufacturing and operations of the camera 150. Further, the recording indicator light 132 may not be visible to the wearer of the HMD.

Figure 1B:
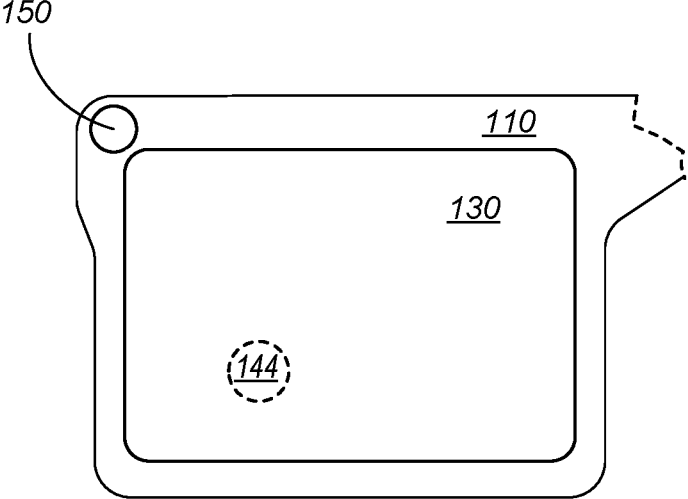
FIG. 1B broadly illustrates embedding a recording indicator light in the lens of a HMD such as a pair of glasses, according to some embodiments

Various embodiments of recording indicators for HMDs including but not limited to smart glasses that provide protection from tampering so that the recording indicators cannot be easily disabled or masked are described. Embodiments of recording indicators that include a light embedded in a clear lens of an HMD (e.g., in a lens of a pair of glasses that are a component of an XR system) are described. FIG. 1B broadly illustrates embedding a recording indicator light 144 in the lens 130 of a HMD such as a pair of glasses, according to some embodiments. When the HMD's camera(s) 150 is recording, the light 144 is on. When the HMD's camera(s) 150 are not recording, the light 144 goes off. The embedded light 144 may not interfere with the view of the wearer through the HMD's lens 130. By embedding the recording indicator light 144 in the lens 130, blocking the light by taping or painting over the light 144, or by removing the light 144, is much less feasible, as such a modification may be more detectable to persons in the environment being recorded and may interfere with the view of the environment by the wearer. In addition, the light 144 may be made more visible to persons being recorded, and in some embodiments may also be made visible to the wearer by directing a portion of the emitted light towards the wearer's eye. Alternatively, a separate output coupler could be used to direct a portion of the light towards the wearer's eye. As noted above, in some embodiments, instead of emitting light from the lens into the environment, the recording indicator system may instead create a tinted or mirrored effect on at least a portion of the lens.

Having a recording indicator within the clear lens of the glasses makes obfuscation much harder, and can be designed such that it is obvious to others when they are being recorded. If a person were to try to tape or paint over the recording indicator area of the lens, it would be much more noticeable to the wearer and others in the environment.

While embodiments are generally described that include a single recording indicator located in one lens of a wearable device, HMDs may include more than one camera that can capture and record video of a wearer's external environment, and there may be a recording indicator for two or more of the cameras. In addition, more than one recording indicator may be used for a single camera. For example, there may be recording indicators in both the left and right lenses of an HMD that are both activated when an HMD is in record mode. Thus, an HMD may include more than one recording indicator as described herein.

While embodiments of recording indicators are generally described with respect to video cameras of HMDs, embodiments of the recording indicator methods and apparatus described herein may also be applied to cameras in other systems, for example handheld video cameras, cameras in cell phones, cameras in smartphones, tablet or pad devices, cameras in laptop or desktop computer systems, and surveillance video cameras.

While embodiments of recording indicators are generally described with respect to recording video captured by cameras of HMDs, embodiments of the recording indicator methods and apparatus described herein may also be applied to recording audio using such devices.

Figure 2A:
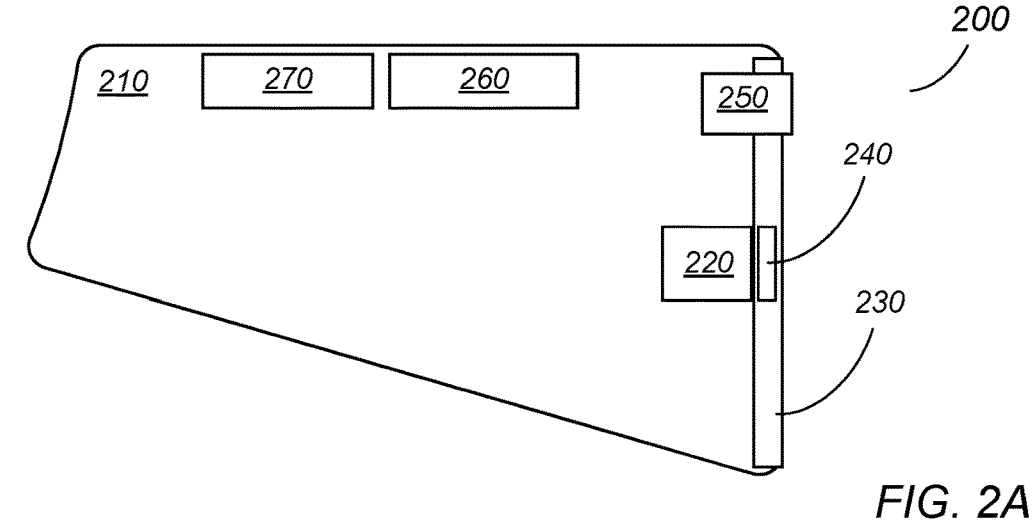
FIGS. 2A through 2C illustrate example HMDs that include a recording indicator comprising an optical stack that provides a recording indicator light emitted from within a lens of the HMD, according to some embodiments.
Figure 2B:
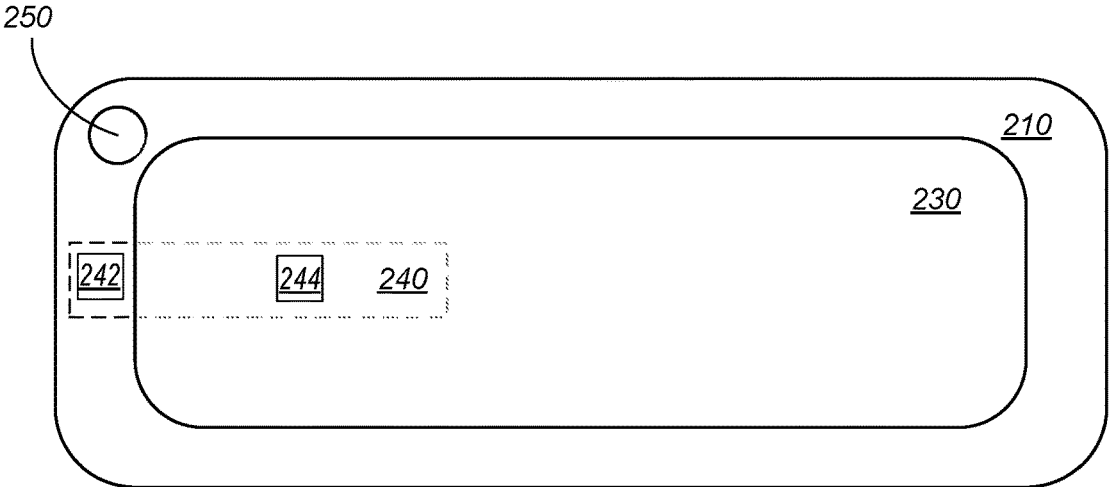
Figure 2C:
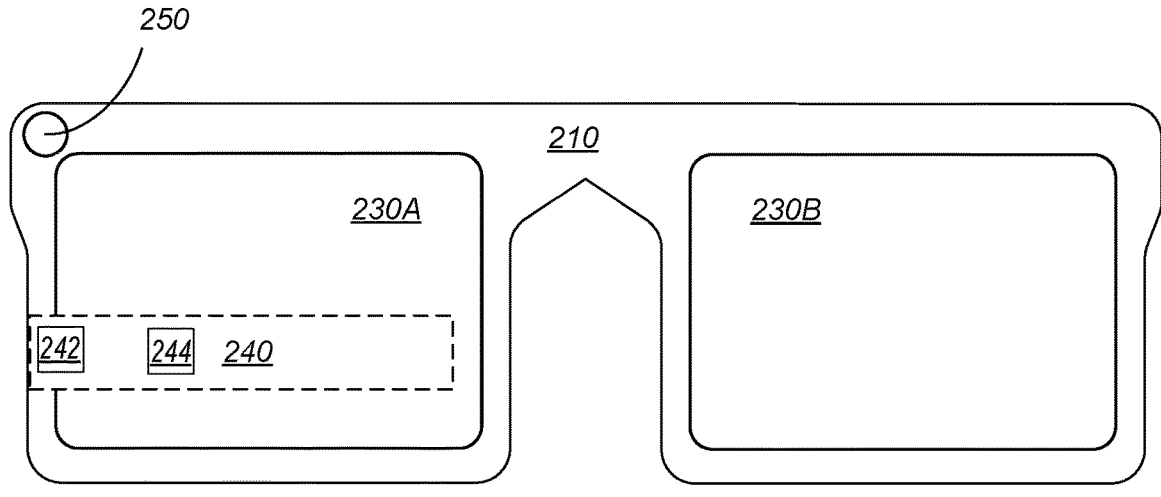

FIGS. 2A through 2C illustrate example head-mounted devices (HMDs) that include a recording indicator comprising an optical stack that provides a recording indicator light emitted from within a lens of the HMD, according to some embodiments. Note that HMDs 200 as illustrated in FIGS. 2A through 2C are given by way of example, and is not intended to be limiting. In various embodiments, the shape, size, and other features of an HMD 200 may differ, and the locations, numbers, types, and other features of the components of an HMD 200 and of the recording indicator system may vary. FIG. 2A shows a side view of an example HMD 200, and FIGS. 2B and 2C show alternative front views of example HMDs 200, with FIG. 2A showing a goggle-like device that has one lens 230 that covers both eyes and FIG. 2B showing a glasses-like device that has right 230A and left 230B lenses.

HMD 200 may include lens(es) 220, mounted in a wearable housing or frame 210. HMD 200 may be worn on a user's head (the "wearer") so that the lens(es) is disposed in front of the wearer's eyes. In some embodiments, an HMD 200 may implement any of various types of display technologies or display systems. For example, HMD 200 may include a display system that directs light that forms images (virtual content) through one or more layers of waveguides in the lens(es) 220; output couplers of the waveguides (e.g., relief gratings or volume holography) may output the light towards the wearer to form images at or near the wearer's eyes. As another example, HMD 200 may include a direct retinal projector system that directs light towards reflective components of the lens(es); the reflective lens(es) is configured to redirect the light to form images at the wearer's eyes.

In some embodiments, HMD 200 may also include one or more sensors that collect information about the wearer's environment (video, depth information, lighting information, etc.) and about the wearer (e.g., eye or gaze tracking sensors). The sensors may include one or more of, but are not limited to one or more eye tracking cameras (e.g., infrared (IR) cameras) that capture views of the user's eyes, one or more world-facing cameras 250 (e.g., RGB video cameras) that can capture images or video of the real-world environment in a field of view in front of the user, and one or more ambient light sensors that capture lighting information for the environment. Camera(s) 250 may be integrated in or attached to the frame 210.

A controller 260 for the XR system may be implemented in the HMD 200, or alternatively may be implemented at least in part by an external device (e.g., a computing system) that is communicatively coupled to HMD 200 via a wired or wireless interface. Controller 260 may include one or more of various types of processors, image signal processors (ISPs), graphics processing units (GPUs), coder/decoders (codecs), system on a chip (SOC), CPUs, and/or other components for processing and rendering video and/or images. In some embodiments, controller 260 may render frames (each frame including a left and right image) that include virtual content based at least in part on inputs obtained from the sensors, and may provide the frames to the display system.

Memory 270 for the XR system may be implemented in the HMD 200, or alternatively may be implemented at least in part by an external device (e.g., a computing system) that is communicatively coupled to HMD 200 via a wired or wireless interface. The memory 270 may, for example, be used to record video or images captured by the one or more cameras 250 integrated in or attached to frame 210. Memory

270 may include any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used in an HMD to store processed data, such as Flash or other "hard drive" technologies. This other storage may be separate from the externally coupled storage mentioned below.

In some embodiments, instead of or in addition to recording video or images captured by the one or more cameras 250 to memory 270, the HMD 200 may include wired or wireless technology that allows the captured raw or processed video or images to be transmitted to an external or remote device or system in real time for recording, or post-recording for storage.

Figure 11:
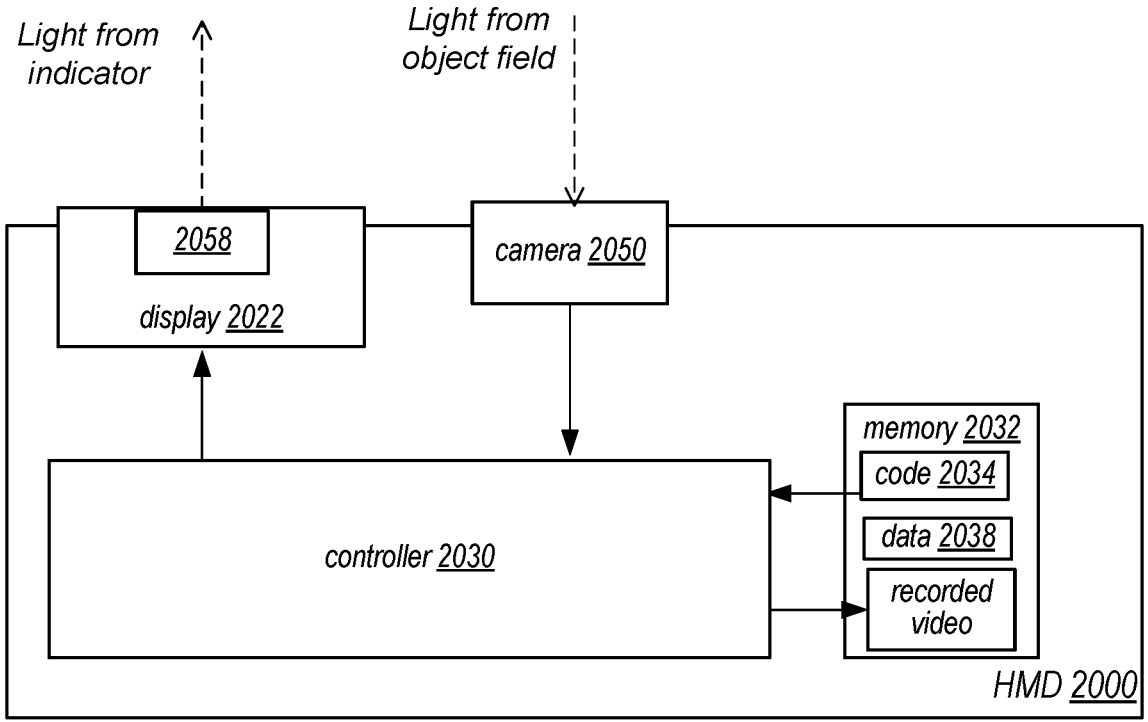
FIG. 11 is a block diagram illustrating an example system that may include components and implement methods for providing recording indicators in an HMD as illustrated in FIGS. 1B through 10, according to some embodiments.

FIG. 11 further illustrates components of an HMD and XR system, according to some embodiments.

Embodiments of an HMD 200 as illustrated in FIGS. 2A-2C may, for example, be used in augmented or mixed (AR) applications to provide augmented or mixed reality views to the wearer. HMD 200 may include one or more sensors, for example located on external surfaces of the HMD 200, that collect information about the wearer's external environment (video, depth information, lighting information, etc.); the sensors may provide the collected information to controller 260 of the XR system. The sensors may include one or more visible light cameras 250 (e.g., RGB video cameras) that capture video of the wearer's environment that, in some embodiments, may be used to provide the wearer with a virtual view of their real environment. In some embodiments, video streams of the real environment captured by the visible light cameras 250 may be processed by the controller 260 of the HMD 200 to render augmented or mixed reality frames that include virtual content overlaid on the view of the real environment, and the rendered frames may be provided to the display system.

The HMD 200 may include recording functionality that allows the wearer to record images or video of the real environment captured by the HMD camera(s) 250, for example by storing the video to memory 270 or alternatively by streaming the video to a remote device for storage via a wired or wireless connection. Various embodiments of recording indicators for HMDs 200 that are embedded in the lens(es) 230 of the HMD and that thus provide protection from tampering so that the recording indicators cannot be easily disabled or masked are described. Note that the camera(s) 250 may in some modes operate to capture frames for processing by the HMD controller 260 while not recording video, in which case the recording indicator may be disabled.

FIGS. 2A through 2C illustrate HMDs 200 that include a recording indicator system comprising an optical stack that provides a recording indicator light emitted from within a lens 230 of the HMD 200. In some embodiments, the optical stack may include passive components including an input coupler 242, a waveguide 240, and an output coupler 244; at least the waveguide 240 and output coupler 244 are embedded in the lens 230. The input 242 and output 244 couplers may, for example, be implemented using relief-based gratings or volume holography-based grating. In some embodiments, switchable gratings may be used in which the polarization/orientation of the gratings can be electronically controlled, or the couplers can be turned on and off. In some embodiments, input couplers 242 may be embedded in the lens, and/or may be made with a combination of reflective or refractive surfaces inside or outside the lens.

In some embodiments, the HMD 200 may also include a light source and optics 220, which may be either dedicated to the recording indicator functionality or part of the XR display system that directs light into the input coupler 242. The light source may be an LED, Laser, or other suitable light source. The optics may include one or more optical lenses that act as collection optics to focus and collimate light emitted by the light source. The light source and optics 220 may, for example, be located within a frame 210 of the HMD 200. The light from the light source and optics 220 is directed from the input coupler 242 through the waveguide 240 to the output coupler 244. The output coupler 244 directs the light away from the wearer into the environment. In some embodiments, the light directed away from the wearer may have an emission cone that is equal to or greater than the field of view of the camera 250. This enables others to know they are being recorded when they can see the recording indicator light emitted from the output coupler 244, and know they are not being recorded when they do not see the recording indicator light, even if the camera 250 is on and recording.

In some embodiments, the output coupler 244 may also direct a portion of the light towards the wearer's eye. Alternatively, a separate output coupler may be used to direct a portion of the light towards the wearer's eye. In some embodiments, the portion of the light that is directed to the wearer's eye may be configured to cover the eye box of the wearer so the wearer can know when the camera 250 is on.

In some embodiments, the light source 220 may be hardware-coupled to the camera 250 or to the controller 260 so that hackers cannot easily disable the light source 220. The coupling could be implemented in several ways. For example, if the recording indicator light is not working, or a broken circuit is detected, a signal could be sent to the camera 250 to disable recording. As another example, the recording indicator light power can be connected to the camera 350 source power. If the camera 350 has power, the recording indicator light turns on. For example, the power of the recording indicator light source could be connected directly to the PMU of the camera. As soon as camera turns on, the recording indicator light turns on. As another example, the recording indicator could be wired into a secure portion of the controller's SOC. Any time the SOC requests camera frames, the signal also goes to the recording indicator to turn it on.

In some embodiments, recording indicator control may be embedded in a secure area of the software of the device. Whenever a program requests frames, the software signals the recording indicator to turn on.

In some embodiments, a recording indicator system may include a light source and optical stack similar to that described above, but with an active input coupler 242 and/or output coupler 244 that can direct the light away from the wearer, to the wearer's eye, or to stay within the lens 230.

In some embodiments, rather than emitting light into the environment, the recording indicator system may include active components that tint a portion (or all) of the clear lens 230 when the camera 250 is enabled and in record mode. The visibility of the tint may be only noticeable in the field of view (FOV) coverage of the camera 250; the active components do not impact the clarity of the clear lens 230 for the wearer. Similarly, in some embodiments, the recording indicator system may include active components that create a partially (or fully) mirrored surface on the lens 230 while not impacting the clarity of the clear lens 230 for the wearer. "Clarity" here means that the tint or mirror effect does not impact the wearer's visual acuity. However, the tinted or mirrored portion of the lens may change the colors or amount of light the wearer sees through that portion.

In some embodiments, the recording indicator generated by the system within the lens 230 (either emitted light, or a tinted or mirrored portion) may be spatially moved around the clear lens 230 and/or may be modulated in time/frequency to make the recording indicator more noticeable.

FIGS. 3A-3B, 4 and 5 further illustrate details of the example recording indicator systems as illustrated in FIGS. 2A-2C. These Figures are top views of an example HMD 200 similar to those illustrated in FIGS. 2A-2C.

Figures 3A, 3B:
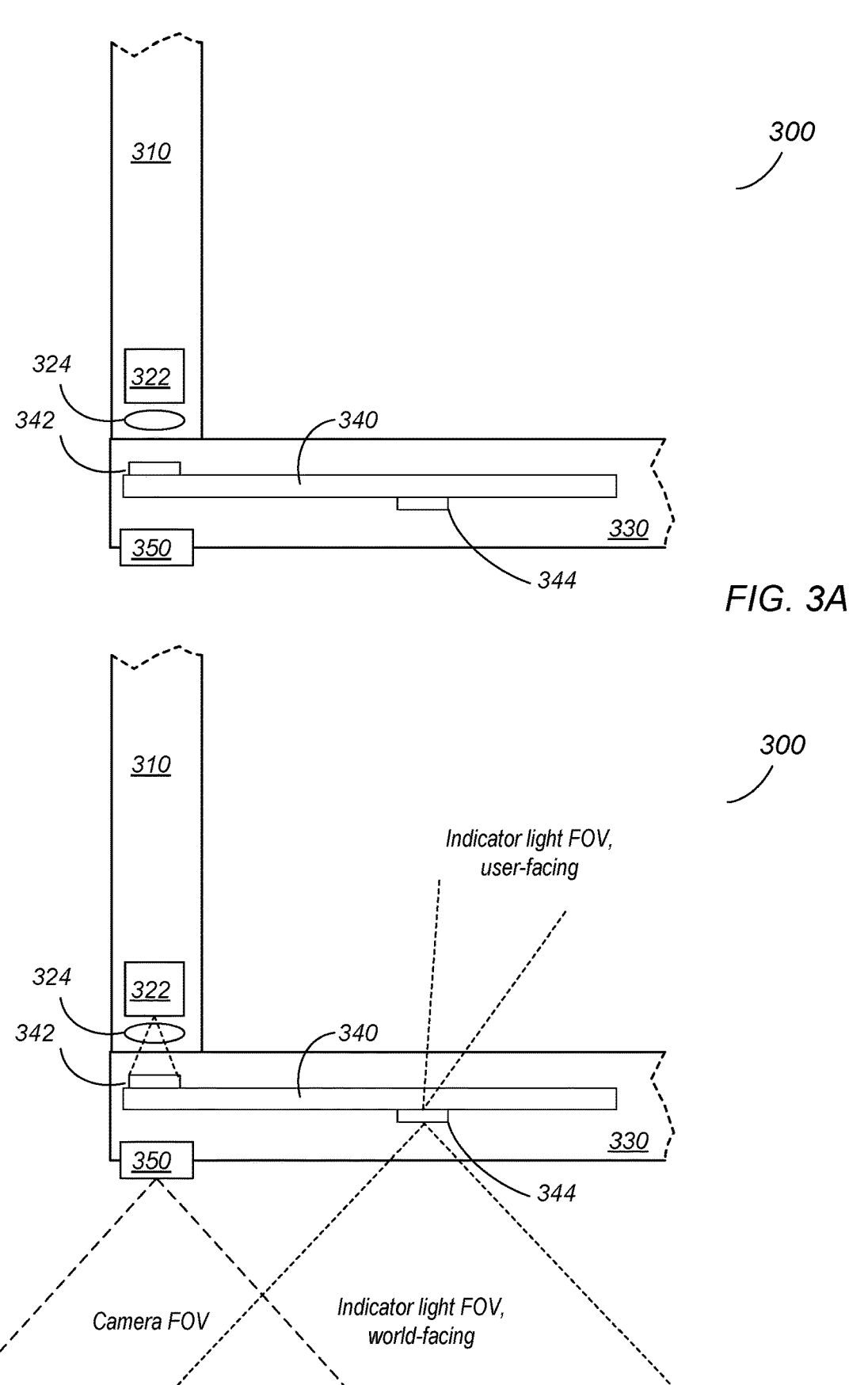
FIGS. 3A and 3B illustrate a recording indicator that emits light from a lens of an HMD into an environment, according to some embodiments.

FIGS. 3A and 3B illustrate a recording indicator that emits light from a lens of an HMD into an environment, according to some embodiments. FIG. 3A illustrates a recording indicator system comprising an optical stack that provides a recording indicator light emitted from within a lens 330 of the HMD 300. In some embodiments, the optical stack may include passive components including an input coupler 342, a clear transmissive optical element such as a waveguide 340, and an output coupler 344; at least the waveguide 340 and output coupler 344 are embedded in the lens 330. The input 342 and output 344 couplers may, for example, be implemented using relief gratings or volume holography. In some embodiments, the HMD 300 may also include a light source 322 and optics 324, which may be either dedicated to the recording indicator functionality or part of the XR display system. The light source 322 and optics 324 may, for example, be located within a frame 310 of the HMD 300. The light source 322 may be an LED, Laser, or other suitable light source. The optics 324 may include one or more optical lenses that act as collection optics to focus and collimate light emitted by the light source 322.

As shown in FIG. 3B, the light from the light source 322 is refracted by optics 324 into the input coupler 342. The light is directed from the input coupler 342 through the waveguide 340 to the output coupler 344. The output coupler 344 directs the light away from the wearer into the environment. In some embodiments, the light directed away from the wearer may have an emission cone that is equal to or greater than the field of view (FOV) of the camera 350. This enables others to know they are being recorded when they can see the recording indicator light emitted from the output coupler 344, and know they are not being recorded when they do not see the recording indicator light, even if the camera 350 is on and recording.

In some embodiments, the output coupler 344 may also direct a portion of the light towards the wearer's eye. Alternatively, a separate output coupler could be used to direct a portion of the light towards the wearer's eye. In some embodiments, the portion of the light that is directed to the wearer's eye may be configured to cover the eye box of the wearer so the wearer can know when the camera 350 is on.

In some embodiments, the light source 322 may be hardware-coupled to the camera 350 or to the controller (not shown) so that hackers cannot easily disable the light source 322. In some embodiments, a recording indicator system may include a light source 322 and optical stack similar to that described above, but with an active input coupler 342 and/or active output coupler 344 that can direct the light away from the wearer, to the wearer's eye, or to stay within the lens 330.

Thus, in the clear lens 330 of an HMD, embodiments provide an area of the lens at which light can be output to the environment as well as potentially to the wearer to indicate that the camera 350 is in record mode. The recording indicator light is part of the clear lens 330, not a black dot, and the HMD may for example be implemented like a normal pair of glasses, with transparent lenses. The recording indicated light can be located anywhere in the clear lens, and can be any size or color. However, for XR applications, in some embodiments the recording indicator light may be located on the lens 330 to be out of the way of any region needed for display. The display optics may include waveguide(s) used for displaying virtual content to the wearer; those regions are dedicated to display, and thus in some embodiments the recording indicator waveguide 340 and light (emitted through the output coupler 344) may be located outside of that region. However, in some embodiments, multiple layers of waveguides may be used to include the recording indicator light within the display region.

Figure 4:
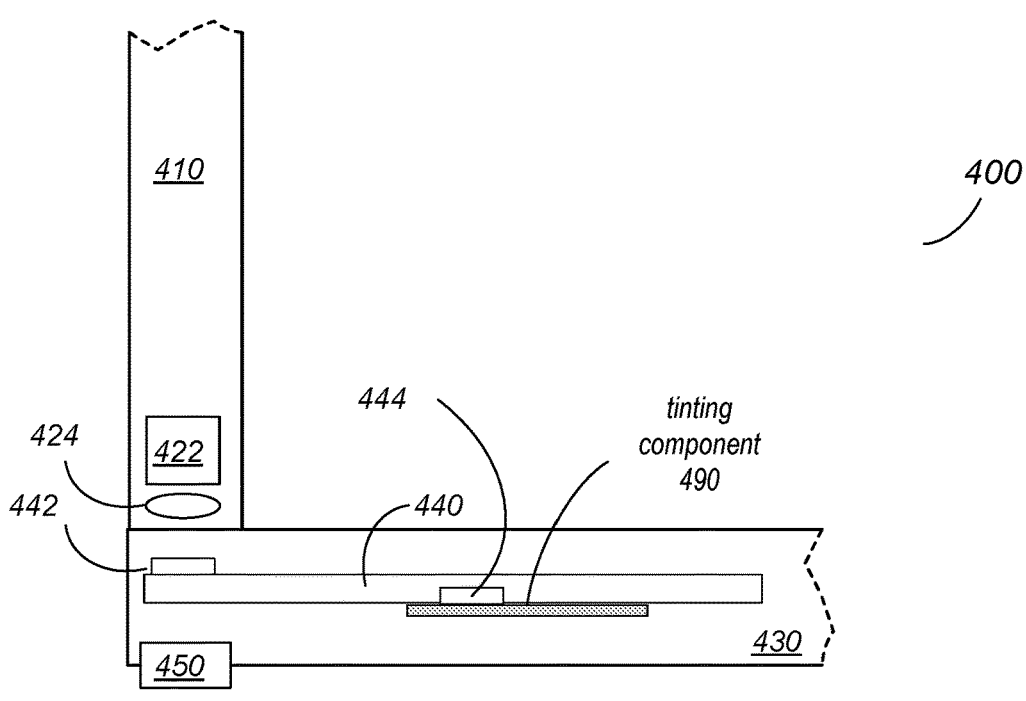
FIG. 4 illustrates a recording indicator that tints a portion of a lens of an HMD, according to some embodiments.

FIG. 4 illustrates a recording indicator that tints a portion or all of a lens of an HMD, according to some embodiments. In some embodiments, rather than emitting light into the environment, the recording indicator system may include an active component 490 that tints at least a portion of the lens 430 when the camera 450 is enabled and in record mode. The visibility of the tinted portion 490 may be only noticeable in the field of view (FOV) coverage of the camera 450; the active component 490 does not impact the clarity of the clear lens 430 for the wearer. "Clarity" here means that the tint effect does not significantly impact the wearer's visual acuity. Note that in some embodiments, the entire lens, or portions or all of both lenses, may be given the tint effect using active components 490.

In some embodiments, the recording indicator system comprises an optical stack that includes an active component 490 that tints a portion or all of a lens 430 of the HMD 400 when the camera 450 is in record mode. In some embodiments, the optical stack may include components including an input coupler 442, a waveguide 440, an output coupler 444, and an active component 490; at least the waveguide 440, output coupler 444 and active component 490 are embedded in the lens 430. In some embodiments, the HMD 400 may also include a light source 422 and optics 424, which may be either dedicated to the recording indicator functionality or part of the XR display system. The light source 422 and optics 424 may, for example, be located within a frame 410 of the HMD 400.

As shown in FIG. 4, when the camera 450 is in record mode, the active component 490 may be activated to generate a tinted portion (or all) of the lens 430. In some embodiments, the active component 490 may rely on ambient light from the environment to generate the tint effect. However, in some embodiments, a light source 422 and waveguide 440 with input 442 and output 444 couplers may be used with the active component 490 to generate or enhance the tint effect, especially in low-light conditions which may, for example, be detected by an ambient light sensor of the HMD 400. In some embodiments, the visibility of the tinted portion of the lens 430 may be only noticeable in the field of view (FOV) coverage of the camera 450. This enables others to know they are being recorded when they can see the tinted portion of the lens 430 created by the active component 490, and know they are not being recorded when they do not see the tinted portion of the lens 430 even if the camera 450 is on and recording. The active component 490 does not impact the clarity of the clear lens 430 for the wearer. "Clarity" here means that the tint effect does not impact the wearer's visual acuity. However, the tinted portion of the lens 430 may change the color or amount of light the wearer sees through that portion.

In some embodiments, the output coupler 444 may direct a portion of the light towards the wearer's eye. Alternatively, a separate output coupler could be used to direct a portion of the light towards the wearer's eye. In some embodiments, the portion of the light that is directed to the wearer's eye may be configured to cover the eye box of the wearer so the wearer can know when the camera 450 is on.

Figure 5:
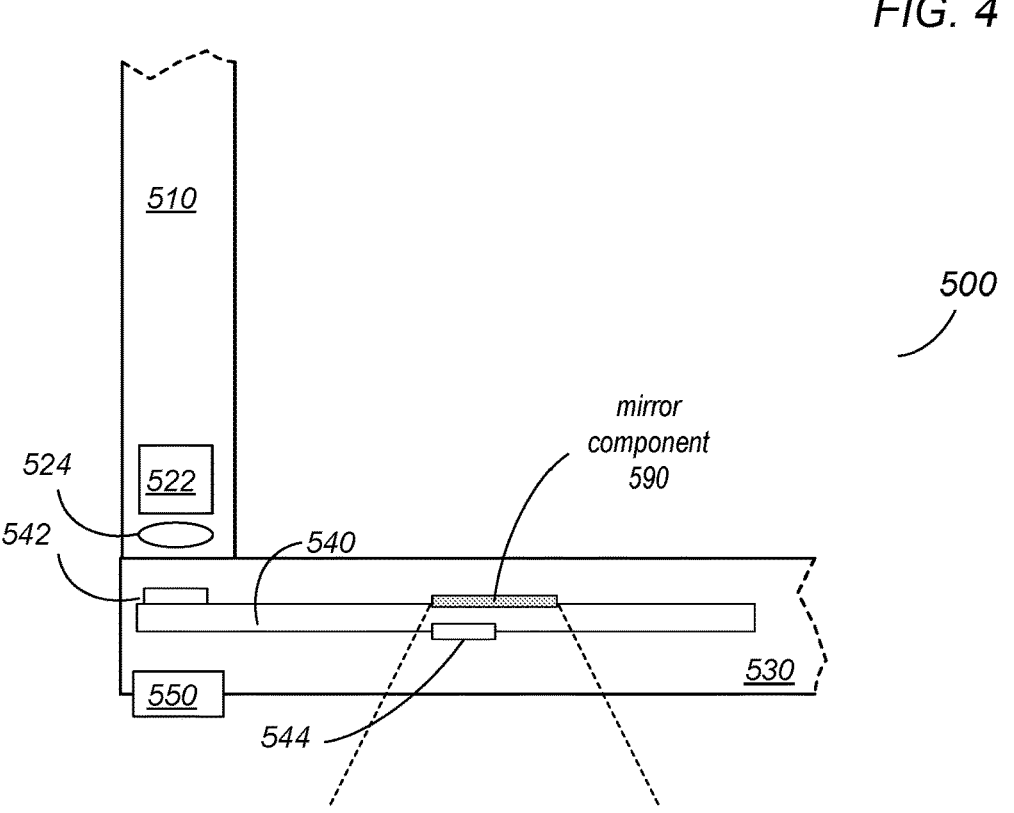
FIG. 5 illustrates a recording indicator that creates a mirrored region on a lens of an HMD, according to some embodiments.

FIG. 5 illustrates a recording indicator that creates a mirrored region on a lens of an HMD, according to some embodiments. In some embodiments, rather than emitting light into the environment, the recording indicator system may include an active component 590 that creates a mirror effect on at least a portion of the clear lens 530 when the camera 550 is enabled and in record mode. The visibility of the mirrored portion may be only noticeable in the field of view (FOV) coverage of the camera 550; the active component 490 does not significantly impact the clarity of the clear lens 530 for the wearer. "Clarity" here means that the mirror effect does not impact the wearer's visual acuity. Note that in some embodiments, the entire lens, or portions or all of both lenses, may be given the mirror effect.

In some embodiments, the recording indicator system comprises an optical stack includes an active component 490 that generates a mirror effect on a portion or all of lens 530 of the HMD 500 when the camera 550 is in record mode. In some embodiments, the optical stack may include components including an input coupler 542, a waveguide 540, an output coupler 544, and an active component 590; at least the waveguide 540, output coupler 544, and active component 590 are embedded in the lens 530. In some embodiments, the HMD 500 may also include a light source 522 and optics 524, which may be either dedicated to the recording indicator functionality or part of the XR display system. The light source 522 and optics 524 may, for example, be located within a frame 510 of the HMD 500.

As shown in FIG. 5, when the camera 550 is in record mode, the active component 590 may be activated to generate a mirror effect in a portion (or all) of the lens 530. In some embodiments, the active component 590 may rely on ambient light from the environment to generate the mirror effect, reflecting the ambient light back into the environment. However, in some embodiments, a light source 522 and waveguide 540 with input 542 and output 544 couplers may be used with the active component 590 to generate or enhance the mirror effect by also reflecting light emitted by the light source, especially in low-light conditions which may, for example, be detected by an ambient light sensor of the HMD 500. In some embodiments, the visibility of the mirrored portion of the lens may be only noticeable in the field of view (FOV) coverage of the camera 550. This enables others to know they are being recorded when they can see the mirrored portion of the lens 530 created by the active component 590, and know they are not being recorded when they do not see the mirrored portion of the lens 530 even if the camera 550 is on and recording. The active component 590 does not significantly impact the clarity of the clear lens 530 for the wearer. "Clarity" here means that the mirror effect does not significantly impact the wearer's visual acuity. However, the mirrored portion of the lens 530 may change the color or amount of light the wearer sees through that portion. In some embodiments, the angle of the reflection created by the active component 590 may be controlled by the active component.

In some embodiments, the output coupler 544 may direct a portion of the light towards the wearer's eye. Alternatively, a separate output coupler could be used to direct a portion of the light towards the wearer's eye. In some embodiments, the portion of the light that is directed to the wearer's eye may be configured to cover the eye box of the wearer so the wearer can know when the camera 550 is on.

Figure 6:
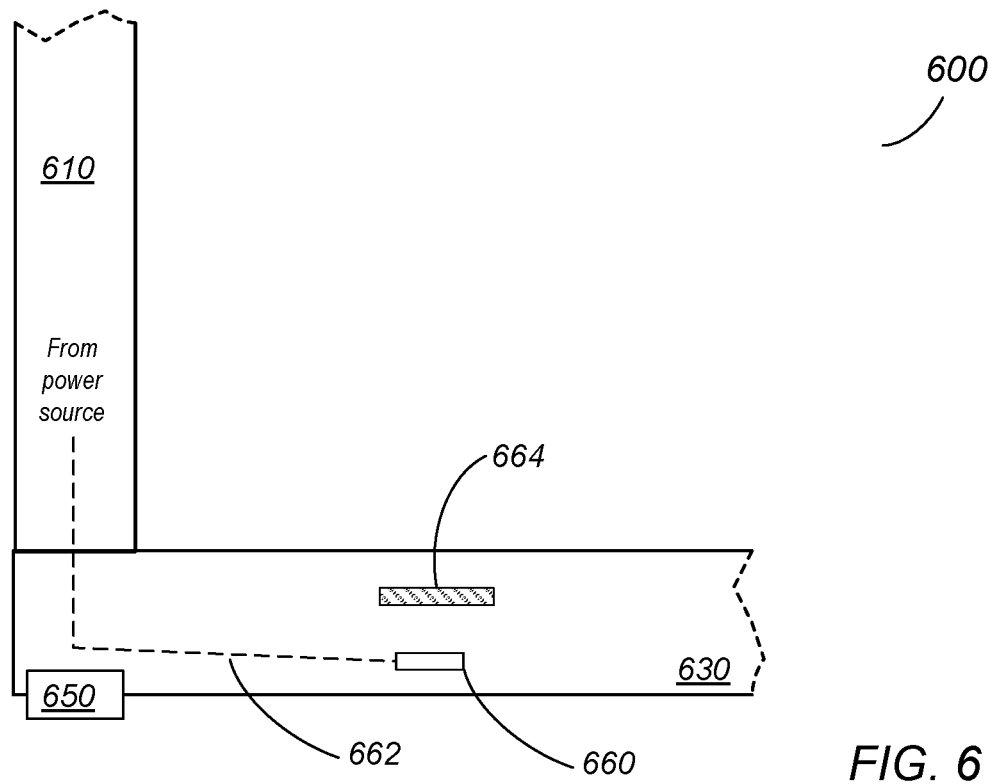
FIG. 6 illustrates a recording indicator light source embedded in the lens of an HMD, according to some embodiments.

FIG. 6 illustrates a recording indicator light source embedded in the lens of an HMD, according to some embodiments. In some embodiments, instead of having a light source and optical stack in the frame and an optical stack including an input coupler, a waveguide, and an output coupler configured to emit light from within the lens as illustrated in FIGS. 3A through 5, a recording indicator system may instead include an embedded light source or sources inside the clear lens 630 of the HMD 600. The light source may include non-visually apparent (e.g., very thin, or transparent) electrical leads and contacts 662 from a power source (not shown) to a light emitting element 660 embedded in the lens 630. The light emitting element 660 may, for example, be a small semiconductor or silicon-based LED or a transparent OLED. In some embodiments that include a transparent OLED, a light stop 664 may be used to block the light from being visible to the wearer, and/or to control the frequency or intensity of the light, and may be an absorptive, reflective, passive or switchable light stop. The recording indicator system turns on the light emitting element 660 in the clear lens 630 when the camera 650 is enabled and in record mode. The visibility of the light emitted by the light emitting element 660 may be only noticeable in the field of view (FOV) coverage of the camera 650; the light emitting element 660 does not impact the clarity of the clear lens 630 for the wearer.

In some embodiments, a portion of the light emitted by the light emitting element 660 may be directed towards the wearer's eye. In some embodiments, the portion of the light that is directed to the wearer's eye may be configured to cover the eye box of the wearer so the wearer can know when the camera 650 is on.

Figure 7:
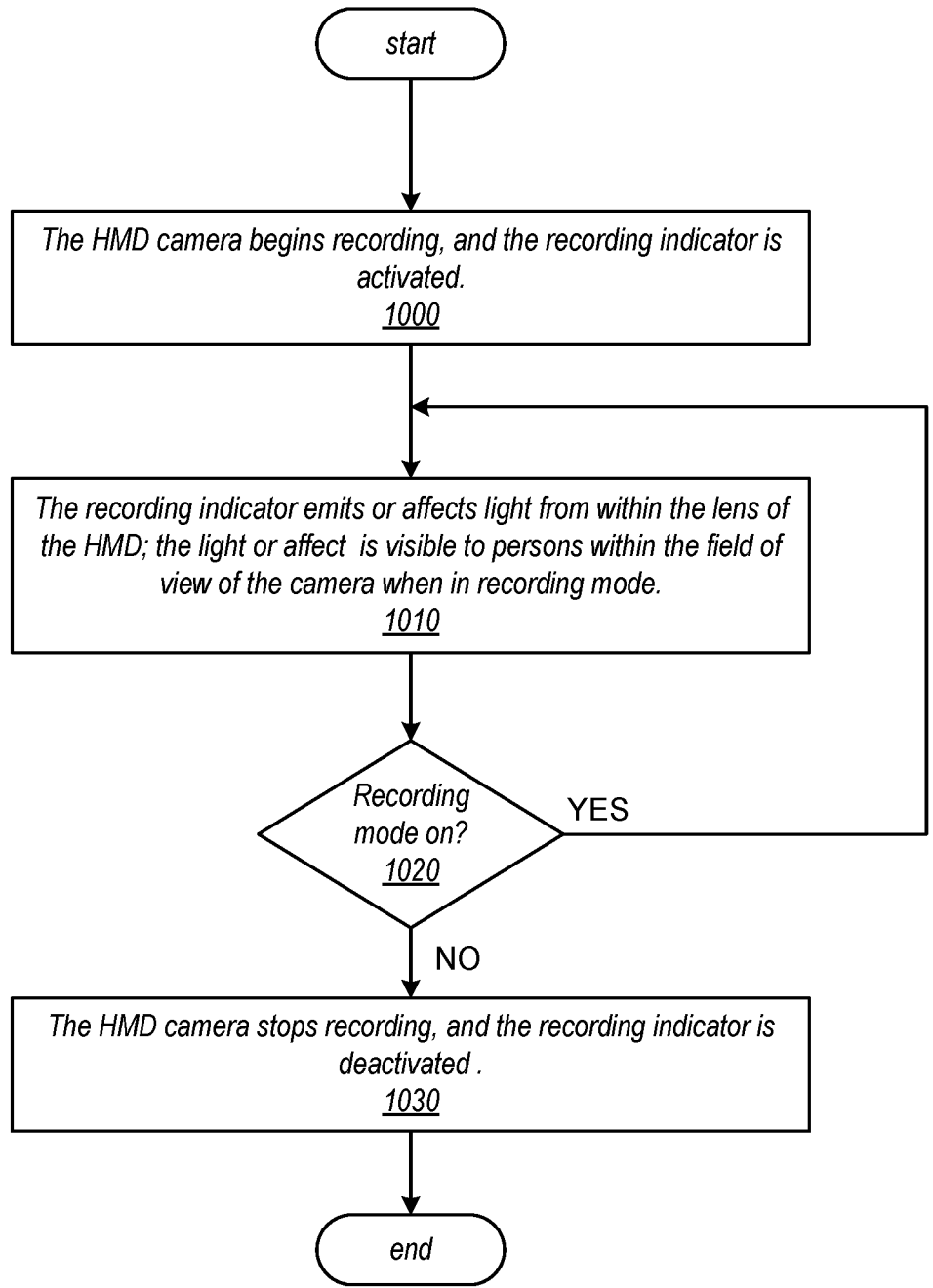
FIG. 7 is a high-level flowchart of a method for providing a recording indicator in an HMD as illustrated in FIGS. 1B through 6, according to some embodiments.

FIG. 7 is a high-level flowchart of a method for providing a recording indicator in an HMD as illustrated in FIGS. 1B through 6, according to some embodiments. As indicated at 1000, an HMD camera begins recording, and the recording indicator is activated. As indicated at 1010, the recording indicator emits (or affects) light from within the lens of the HMD; the emitted light or affect is visible to persons within the field of view of the camera when in record mode. At 1020, if record mode is still on, the recording indicator continues to emit or affect light. Otherwise, the HMD camera stops recording, and the recording indicator is deactivated as indicated at 1030. In some embodiments, the recording indicator may emit a portion of the light towards the wearer's eye.

Figure 8:
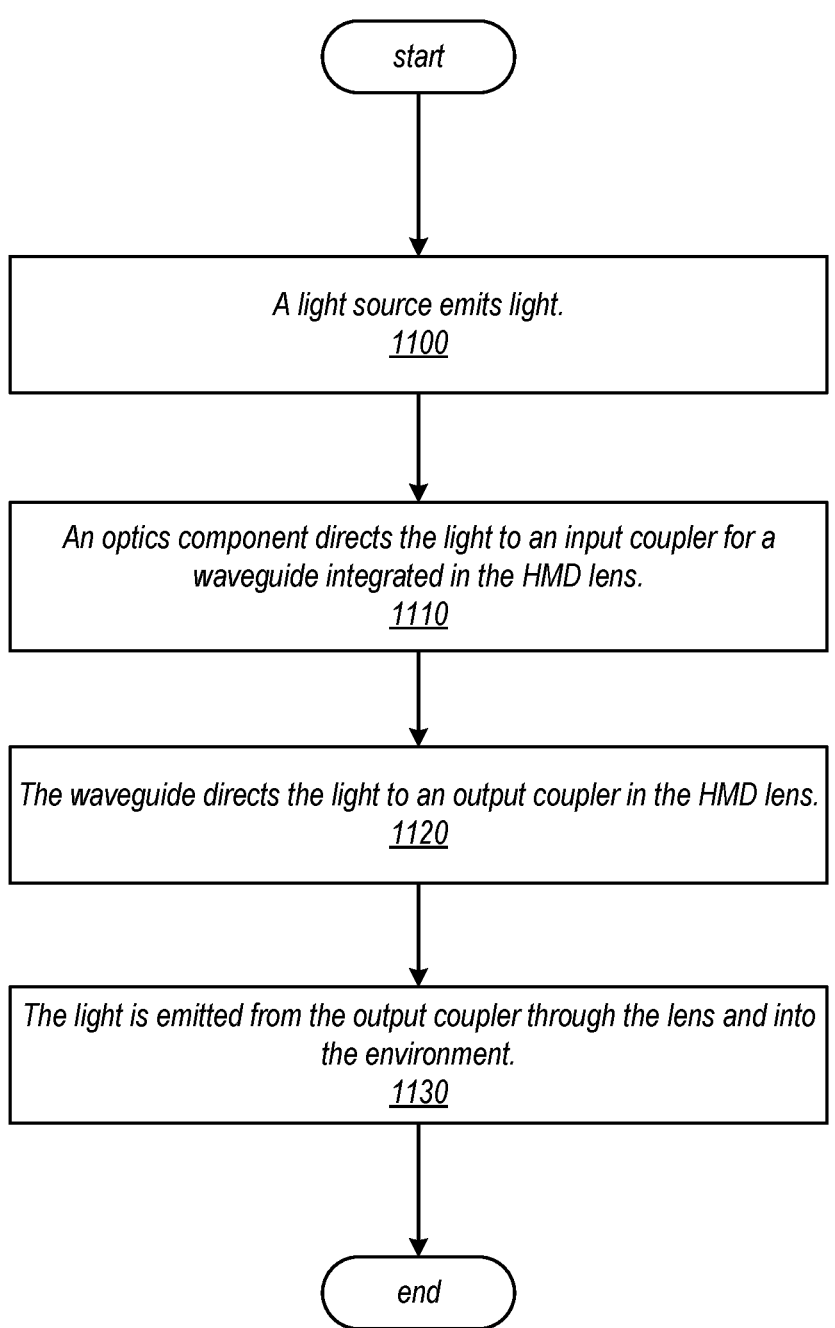
FIG. 8 is a flowchart of a method for providing a recording indicator in an HMD as illustrated in FIGS. 3A and 3B, according to some embodiments.

FIG. 8 is a flowchart of a method for providing a recording indicator in an HMD as illustrated in FIGS. 3A and 3B, according to some embodiments. As indicated at 1100, when in record mode, a light source emits light. As indicated at 1110, an optics component directs the light to an input coupler for a waveguide integrated in the HMD lens. As indicated at 1120, the waveguide directs the light to an output coupler in the HMD lens. As indicated at 1130, the light is emitted from the output coupler through the lens and into the environment.

Figure 9:
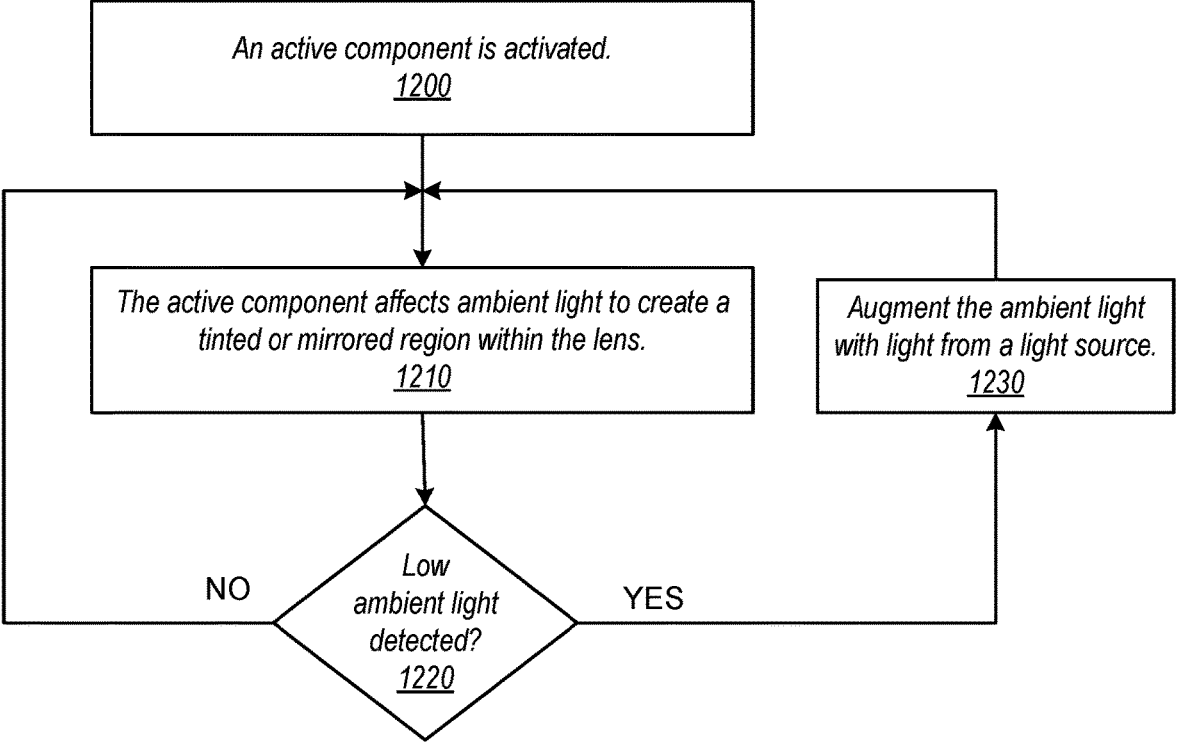
FIG. 9 is a flowchart of a method for providing a recording indicator in an HMD as illustrated in FIGS. 4 and 5, according to some embodiments.
Figure 10:
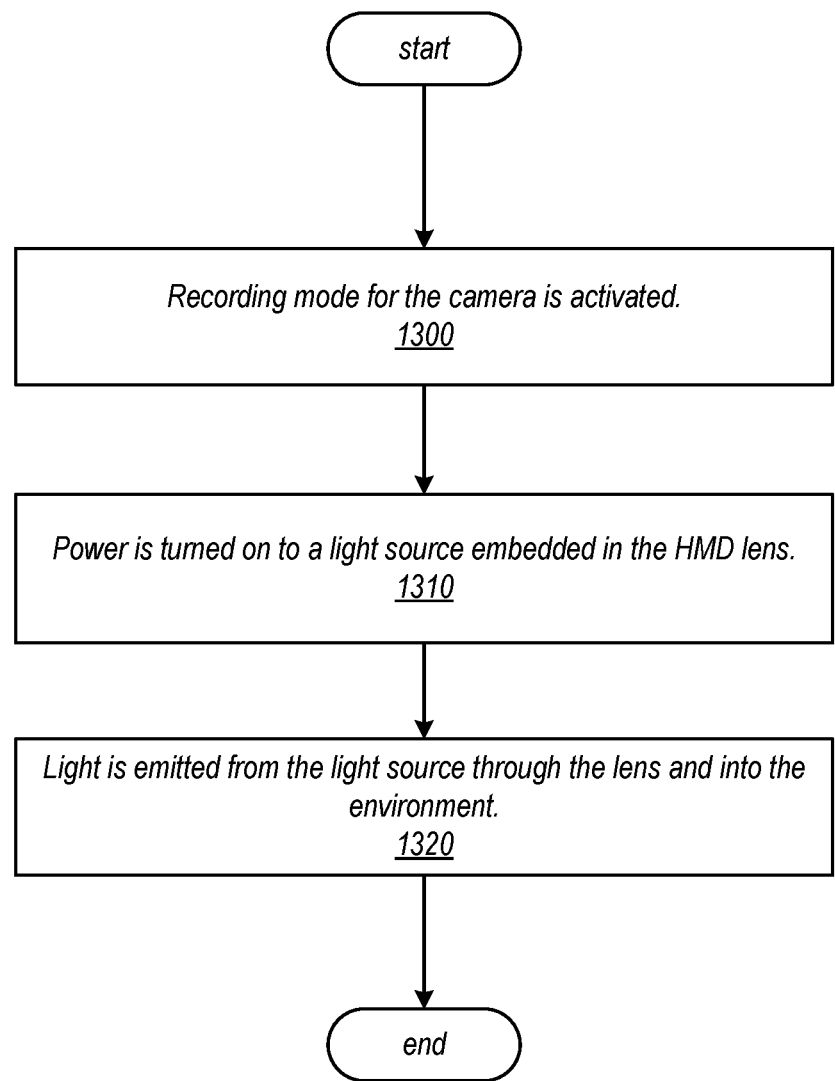
FIG. 10 is a flowchart of a method for providing a recording indicator in an HMD as illustrated in FIG. 6, according to some embodiments.

FIG. 9 is a flowchart of a method for providing a recording indicator in an HMD as illustrated in FIGS. 4 and 5, according to some embodiments. As indicated at 1200, an active component is activated when a camera of the HMD is on and in record mode. As indicated at 1210, the active component affects ambient light to create a tinted or mirrored region within the lens. At 1220, if low ambient light is detected, for example by an ambient light sensor of the HMD, the ambient light may be augmented with light from a light source of the HMD as indicated at 1230. The HMD may include an ambient light sensor configured to detect brightness of the ambient light; the light source may be configured to be activated upon detection that the ambient light is below an ambient light threshold. Otherwise at 1220, the active component continues to affect only ambient light. Note that in some embodiments the light source may always be active to augment ambient light, or the light source may be optionally turned on or off to augment ambient light. As indicated at 1220, FIG. 10 is a flowchart of a method for providing a recording indicator in an HMD as illustrated in FIG. 6, according to some embodiments. As indicated at 1300, record mode for the camera is activated. As indicated at 1310, power is turned on to a light source embedded in the HMD lens. As indicated at 1320, light is emitted from the light source through the lens and into the environment.

FIG. 11 is a block diagram illustrating an example system that may include components and implement methods for providing recording indicators in an HMD as illustrated in FIGS. 1B through 10, according to some embodiments.

In some embodiments, an XR system may include an HMD 2000 such as a headset, helmet, goggles, or glasses. HMD 2000 may implement any of various types of display technologies. For example, HMD 2000 may include a transparent or translucent display 2022 (e.g., eyeglass lenses) through which the user may view the real environment and a medium integrated with display 2022 through which light representative of virtual images is directed to the wearer's eyes to provide an augmented view of reality to the wearer.

In some embodiments, HMD 2000 may include a controller 2030 configured to implement functionality of the XR system and to generate frames (each frame including a left and right image) that are provided to display 2022. In some embodiments, HMD 2000 may also include memory 2032 configured to store software (code 2034) of the XR system that is executable by the controller 2030, as well as data 2038 that may be used by the XR system when executing on the controller 2030. In some embodiments, memory 2032 may also be used to store video captured by camera 2050. In some embodiments, HMD 2000 may also include one or more interfaces (e.g., a Bluetooth technology interface, USB interface, etc.) configured to communicate with an external device (not shown) via a wired or wireless connection. In some embodiments, at least a part of the functionality described for the controller 2030 may be implemented by the external device. The external device may be or may include any type of computing system or computing device, such as a desktop computer, notebook or laptop computer, pad or tablet device, smartphone, hand-held computing device, game controller, game system, and so on.

In various embodiments, controller 2030 may be a uni-processor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies.

In some embodiments, the HMD 2000 may include one or more sensors (not shown) that collect information about the user's environment (video, depth information, lighting information, etc.). The sensors may provide the information to the controller 2030 of the XR system. In some embodiments, the sensors may include, but are not limited to, at least one visible light camera 2050 (e.g., an RGB video camera) and ambient light sensors.

In some embodiments, the HMD 2000 may be configured to render and display frames to provide an augmented or mixed reality (MR) view for the user based at least in part according to sensor inputs. The MR view may include renderings of the user's environment, including renderings of real objects in the user's environment, based on video captured by one or more video cameras 2050 that capture high-quality, high-resolution video of the user's environment for display. The MR view may also include virtual content (e.g., virtual objects, virtual tags for real objects, avatars of the user, etc.) generated by the XR system and composited with the displayed view of the user's real environment.

The HMD 2000 may include recording functionality that allows the user to record images or video of the real environment captured by the HMD camera(s) 2050. The HMD 2000 may include a recording indicator 2058 that is integrated in the display 2022 (for example, within a clear lens) and that emits visible light through the so that the recording indicator 2058 covers the field of view of the camera 2050, for example as illustrated in FIGS. 1B through 10.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The following clauses describe various example embodiments consistent with the description provided herein.

Clause 1. A device, comprising:
a frame;
a camera coupled to the frame;
a lens coupled to the frame and configured to be positioned in front of a wearer's eye; and
a recording indicator configured to emit visible light from a location within the lens into an environment in front of the device when the camera is operating in record mode.

Clause 2. The device as recited in clause 1, wherein the recording indicator includes:
a light source located within the frame;
a waveguide located within the lens;
an input coupler located between the light source and the waveguide; and
an output coupler located within the lens and between the waveguide and a surface of the lens.

Clause 3. The device as recited in clause 2,
wherein the light source is configured to emit light towards the input coupler when the camera is in record mode;
wherein the input coupler is configured to direct the light into the waveguide; and
wherein the waveguide is configured to direct the light to the output coupler.

Clause 4. The device as recited in clause 3, wherein the output coupler emits the visible light from the location within the lens into the environment in front of the device.

Clause 5. The device as recited in clause 3, further comprising optics located between the light source and the input coupler configured to collimate the light emitted by the light source.

Clause 6. The device as recited in clause 3, wherein the output coupler is further configured to emit a portion of the light towards a wearer's eye.

Clause 7. The device as recited in clause 2, wherein the light source is an LED (light-emitting diode) light source or a Laser light source.

Clause 8. The device as recited in clause 2, wherein one or both of the input coupler and the output coupler are active couplers that can be turned on and off.

Clause 9. The device as recited in clause 1, wherein the recording indicator includes:
a light source located within the frame; and a waveguide located within the lens;
wherein the waveguide is configured to direct the light from the light source to the location within the lens.

Clause 10. The device as recited in clause 1, wherein the recording indicator includes:
a light source embedded within the lens; and
an electrical lead connecting the light source to a power source within the frame;
wherein power is supplied to the light source through the lead when the camera is in record mode.

Clause 11. The device as recited in clause 10, wherein the light source is an LED light source or a transparent organic light-emitting diode (OLED) light source.

Clause 12. The device as recited in clause 1, further comprising a light stop located between the light source and the wearer's eye.

Clause 13. The device as recited in clause 1, wherein the visible light emitted by the recording indicator covers a field of view of the camera.

Clause 14. The device as recited in clause 1, wherein the recording indicator is activated when the camera is in record mode and deactivated when the camera is not in record mode.

Clause 15. The device as recited in clause 1, wherein the device is a head-mounted device (HMD) of an extended reality (XR) system.

Clause 16. The device as recited in clause 1, wherein the device includes memory configured to store video captured by the camera when the camera is in record mode.

Clause 17. A system, comprising:
a head-mounted device (HMD), comprising:
a frame;
a controller comprising one or more processors;
a video camera integrated in or attached to the frame and configured to capture video of an environment under control of the controller;
memory configured to record the video captured by the video camera when in record mode;
at least one lens coupled to the frame configured to display virtual content generated by the controller; and
a recording indicator configured to emit visible light from a location within the lens into the environment when the camera is operating in record mode.

Clause 18. The system as recited in clause 17, wherein the recording indicator includes:
a light source located within the frame, wherein the light source is an LED (light-emitting diode) light source or a Laser light source;
a waveguide located within the lens;
an input coupler located between the light source and the waveguide;
optics located between the light source and the input coupler configured to collimate the light emitted by the light source; and
an output coupler located within the lens and between the waveguide and a surface of the lens;
wherein the light source is configured to emit light through the optics towards the input coupler when the camera is in record mode;
wherein the input coupler is configured to direct the light into the waveguide; and
wherein the waveguide is configured to direct the light to the output coupler.

Clause 19. The system as recited in clause 18, wherein the output coupler emits the visible light from the location within the lens into the environment in front of the device.

Clause 20. The system as recited in clause 18, wherein the output coupler is further configured to emit a portion of the light towards a wearer's eye.

Clause 21. The system as recited in clause 18, wherein one or both of the input coupler and the output coupler are active couplers that can be turned on and off.

Clause 22. The system as recited in clause 17, wherein the recording indicator includes:
a light source embedded within the lens, wherein the light source is an LED light source or a transparent organic light-emitting diode (OLED) light source;
and an electrical lead connecting the light source to a power source within the frame;

wherein power is supplied to the light source through the lead when the camera is in record mode.

Clause 23. The system as recited in clause 22, wherein the electrical lead is a transparent or thin electrical lead.

Clause 24. The system as recited in clause 17, further comprising a light stop located between the light source and the wearer's eye.

Clause 25. The system as recited in clause 17, wherein the visible light emitted by the recording indicator covers a field of view of the camera.

Clause 26. The system as recited in clause 17, wherein the system is an extended reality (XR) system.

Clause 27. A device, comprising:
a frame;
a camera coupled to the frame;
a lens coupled to the frame and configured to be positioned in front of a wearer's eye; and
a recording indicator comprising an active component configured to affect ambient light within a region of the lens when the camera is operating in record mode, wherein the affected region of the lens is visible in an environment in front of the device.

Clause 28. The device as recited in clause 27, wherein the active component is configured to create a tinted effect within the region of the lens when the camera is operating in record mode.

Clause 29. The device as recited in clause 27, wherein the active component is configured to create a mirror effect within the region of the lens when the camera is operating in record mode.

Clause 30. The device as recited in clause 27, further comprising a light source located within the frame, wherein the light source is configured to be activated to augment the ambient light affected by the active component.

Clause 31. The device as recited in clause 30, further comprising:
a waveguide located within the lens;
an input coupler located between the light source and the waveguide; and
an output coupler located within the lens;
wherein light emitted by the light source when activated is directed to the active component by the input coupler, waveguide, and output coupler.

Clause 32. The device as recited in clause 30, further comprising an ambient light sensor configured to detect brightness of the ambient light, wherein the light source is configured to be activated upon detection that the ambient light is below an ambient light threshold.

Clause 33. The device as recited in clause 27, wherein an effect created by the active component is visible within a field of view of the camera.

Clause 34. The device as recited in clause 27, wherein the recording indicator is activated when the camera is in record mode and deactivated when the camera is not in record mode.

Clause 35. The device as recited in clause 27, wherein the device is a head-mounted device (HMD) of an extended reality (XR) system.

Clause 36. The device as recited in clause 27, wherein the device includes memory configured to store video captured by the camera when the camera is in record mode.

Clause 37. A system, comprising:
a head-mounted device (HMD), comprising:
a frame;
a controller comprising one or more processors;
a video camera integrated in or attached to the frame and configured to capture video of an environment under control of the controller;
memory configured to record the video captured by the video camera when in record mode;
at least one lens coupled to the frame configured to display virtual content generated by the controller; and
a recording indicator comprising an active component configured to affect ambient light within a region of the lens when the camera is operating in record mode, wherein the affected region of the lens is visible in an environment in front of the device.

Clause 38. The device as recited in clause 37, wherein the active component is configured to create a tinted effect within the region of the lens when the video camera is operating in record mode.

Clause 39. The device as recited in clause 37, wherein the active component is configured to create a mirror effect within the region of the lens when the video camera is operating in record mode.

Clause 40. The device as recited in clause 37, further comprising a light source located within the frame, wherein the light source is configured to be activated to augment the ambient light affected by the active component.

Clause 41. The device as recited in clause 40, further comprising an ambient light sensor configured to detect brightness of the ambient light, wherein the light source is configured to be activated upon detection that the ambient light is below an ambient light threshold.

Clause 42. The device as recited in clause 37, wherein an effect created by the active component is visible within a field of view of the camera.

Clause 43. The system as recited in clause 37, wherein the system is an extended reality (XR) system.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a frame;
a camera coupled to the frame;
a lens coupled to the frame and configured to be positioned in front of a wearer's eye;
a recording indicator configured to emit visible light from a location within the lens into an environment in front of the device when the camera is operating in record mode, wherein the visible light is generated using a light source; and
a light stop located between the light source and the wearer's eye.

2. The device as recited in claim 1, wherein the recording indicator includes:
a waveguide located within the lens;
an input coupler located between the light source and the waveguide; and
an output coupler located within the lens and between the waveguide and a surface of the lens.

3. The device as recited in claim 2,
wherein the light source is configured to emit light towards the input coupler when the camera is in record mode;
wherein the input coupler is configured to direct the light into the waveguide; and
wherein the waveguide is configured to direct the light to the output coupler.

4. The device as recited in claim 3, wherein the output coupler emits the visible light from the location within the lens into the environment in front of the device.

5. The device as recited in claim 3, further comprising optics located between the light source and the input coupler configured to collimate the light emitted by the light source.

6. The device as recited in claim 3, wherein the output coupler is further configured to emit a portion of the light towards a wearer's eye.

7. The device as recited in claim 2, wherein one or both of the input coupler and the output coupler are active couplers that can be turned on and off.

8. The device as recited in claim 1, wherein the recording indicator includes:
a waveguide located within the lens; and
wherein the waveguide is configured to direct the light from the light source to the location within the lens.

9. The device as recited in claim 1, wherein the recording indicator includes:
the light source embedded within the lens; and
an electrical lead connecting the light source to a power source within the frame;
wherein power is supplied to the light source through the lead when the camera is in record mode.

10. The device as recited in claim 1, wherein the visible light emitted by the recording indicator covers a field of view of the camera.

11. The device as recited in claim 1, wherein the recording indicator is activated when the camera is in record mode and deactivated when the camera is not in record mode.

12. The device as recited in claim 1, wherein the device is a head-mounted device (HMD) of an extended reality (XR) system.

13. A system, comprising:
a head-mounted device (HMD), comprising:
a frame;
a controller comprising one or more processors;
a video camera integrated in or attached to the frame and configured to capture video of an environment under control of the controller;
memory configured to record the video captured by the video camera when in record mode;
at least one lens coupled to the frame configured to display virtual content generated by the controller;
a recording indicator configured to emit visible light from a location within the lens into the environment when the camera is operating in record mode, wherein the visible light is generated using a light source for the head-mounted device; and
a light stop located between the light source and the wearer's eye.

14. The system as recited in claim 13, wherein the recording indicator includes:
the light source, wherein the light source is an LED (light-emitting diode) light source or a Laser light source;
a waveguide located within the lens;
an input coupler located between the light source and the waveguide;
optics located between the light source and the input coupler configured to collimate the light emitted by the light source; and
an output coupler located within the lens and between the waveguide and a surface of the lens;
wherein the light source is configured to emit light through the optics towards the input coupler when the camera is in record mode;
wherein the input coupler is configured to direct the light into the waveguide; and
wherein the waveguide is configured to direct the light to the output coupler.

15. The system as recited in claim 14, wherein the output coupler is further configured to emit a portion of the light towards a wearer's eye.

16. The system as recited in claim 14, wherein one or both of the input coupler and the output coupler are active couplers that can be turned on and off.

17. The system as recited in claim 13, wherein the recording indicator includes:
the light source embedded within the lens, wherein the light source is an LED light source or a transparent organic light-emitting diode (OLED) light source; and
an electrical lead connecting the light source to a power source within the frame;
wherein power is supplied to the light source through the lead when the camera is in record mode.

18. The system as recited in claim 17, wherein the electrical lead is a transparent or thin electrical lead.

19. A device, comprising:
a frame;
a camera coupled to the frame;
a lens coupled to the frame and configured to be positioned in front of a wearer's eye; and
a recording indicator comprising an active component configured to affect ambient light within a region of the lens when the camera is operating in record mode, wherein the affected region of the lens is visible in an environment in front of the device.

* * * * *